United States Patent
Kay et al.

(10) Patent No.: US 11,309,958 B2
(45) Date of Patent: Apr. 19, 2022

(54) VARIABLE STAYOUT DISTANCE FOR BEAMHOPPING SATELLITE

(71) Applicants: Stanley Kay, Germantown, MD (US); Udaya Bhaskar, Germantown, MD (US); Neal David Becker, Germantown, MD (US)

(72) Inventors: Stanley Kay, Germantown, MD (US); Udaya Bhaskar, Germantown, MD (US); Neal David Becker, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 171 days.

(21) Appl. No.: 16/729,870

(22) Filed: Dec. 30, 2019

(65) Prior Publication Data

US 2021/0203414 A1 Jul. 1, 2021

(51) Int. Cl.
*H04B 7/06* (2006.01)
*H04B 7/204* (2006.01)
*H04B 7/185* (2006.01)

(52) U.S. Cl.
CPC ......... *H04B 7/2041* (2013.01); *H04B 7/0617* (2013.01); *H04B 7/18513* (2013.01); *H04B 7/18515* (2013.01)

(58) Field of Classification Search
CPC .......................... H04B 7/2041; H04B 7/0617; H04B 7/18513; H04B 7/18515; H04B 7/18519
See application file for complete search history.

(56) References Cited

U.S. PATENT DOCUMENTS

| 2013/0154874 A1 | 6/2013 | Burr |
| 2016/0105806 A1* | 4/2016 | Noerpel ................. H01Q 1/288 455/12.1 |
| 2019/0207676 A1 | 7/2019 | Noerpel et al. |

FOREIGN PATENT DOCUMENTS

EP 3439196 A1 2/2019

OTHER PUBLICATIONS

Demers Yves et al: "Ka-band user antennas for VHTS GEO applications", 2017 11th European Conference on Antennas and Propagation (EUCAP), EURAAP, Mar. 19, 2017 (Mar. 19, 2017), pp. 2418-2422, XP033097861, DOI: 10.23919/EUCAP.2017.7928803 [retrieved on May 15, 2017] Sections I and IV.
International search report for PCT Application No. PCT/US2020/067293.

(Continued)

*Primary Examiner* — Minh Trang T Nguyen
(74) *Attorney, Agent, or Firm* — Capitol City TechLaw; Jasbir Singh

(57) ABSTRACT

A system and method for scheduling a variable stayout distance when beam hopping, the method including providing an illumination area of a satellite and candidate beam centers disposed in the illumination area; measuring a respective scan angle from an antenna boresight to a respective beam center of the candidate beam centers; and determining a reuse factor k for each of the candidate beam centers, based on a proportion of the respective scan angle to a maximum scan angle. Each candidate beam center may be processed sequentially. Prior to adding each candidate beam center to a current beam center set, checking whether a candidate beam center meets the stayout distance criteria from all beam centers already in the beam center set.

18 Claims, 2 Drawing Sheets

(56) References Cited

OTHER PUBLICATIONS

Rao S K: "Parametric design and analysis of multiple-beam reflector antennas for satellite communications", IEEE Antennas and Propagation Magazine, IEEE Service Center, Piscataway, NJ, US, vol. 45, No. 4, Aug. 1, 2003 (Aug. 1, 2003), pp. 26-34, XP011102960, ISSN: 1045-9243, DOI: 10.1109/MAP.2003.1241308 pp. 28-31.

Shree Krishna et al: "Cognitive Beamhopping for Spectral Coexistence of Multibeam Satellites", International Journal of Satellite Communications and Networking, Jan. 1, 2013 (Jan. 1, 2013), XP055796288, DOI: 10.1002/sat Retrieved from the Internet: URL:https://core.ac.uk/download/pdf/191239879.pdf [retrieved on Apr. 16, 2021] Sections 5 and 6.

\* cited by examiner

VARIABLE STAYOUT DISTANCE FOR BEAMHOPPING SATELLITE

FIELD

A scheduler that adapts its stayout distance to accommodate a reduced performance due to scan loss in a Very High Throughput Satellite (VHTS) system using beam hopping and antennas with high scan distortion towards the edges of a coverage area.

BACKGROUND

Classical satellite systems use fixed beam laydowns over time, typically implementing a fixed reuse pattern (e.g., 3-color reuse). Some systems have implemented "beamhopping", a beam laydown that is not constant over time, with the concept of a "stayout distance". No two cells are permitted to be in the illuminated set if the distance between the cell centers is less than this stayout distance. The stayout distance is designed to limit interference between cells, for example, Co-channel interference (CCI). The use of fixed stayout distance is disadvantageous in systems where the beam characteristics are not constant over the coverage area.

Beam hopping satellites require a beam hopping scheduling mechanism that needs to accommodate a spatially and temporally varying traffic pattern. Previous beam hopping systems accounted for these factors but not the degraded performance over the coverage area caused by changes in the antenna performance over that coverage area.

A satellite antenna will typically produce the most compact beams towards the antenna boresite and will produce degraded beams as the angle between the boresite and the beam center increases, an effect referred to as scan loss. The area covered by the beams at larger angles from the boresite (scanned beams) is larger than the area covered by the beams at the boresite.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings improve VHTS design. The VHTS is a major building block of the satellite consumer, aeronautical, defense, government, enterprise and international business areas. The present teachings disclose a variable stayout distance to accommodate the loss of beam performance as a function of scan angle.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a non-transient computer-readable storage medium having instructions embodied there onto implement a method for scheduling a variable stayout distance when beam hopping. The method including providing an illumination area of a satellite and candidate beam centers disposed in the illumination area; measuring a respective scan angle from an antenna boresight to a respective beam center of the candidate beam centers; and determining a reuse factor k, for each of the candidate beam centers, based on a proportion of the respective scan angle to a maximum scan angle. Other embodiments of this aspect include corresponding computer systems, apparatus, and computer programs recorded on one or more computer storage devices, each configured to perform the actions of the methods.

In the following the terms "stayout distance" and "reuse factor" will be used. As is well known from the cellular radio field, for a fixed color reuse pattern there is a relationship between a reuse factor k, a distance D between the centers of cells of the same color and a cell radius R, namely, $D = \sqrt{3k}R$, where k is the number of distinct sets of orthogonal resources (colors).

Implementations may include one or more of the following features. The method where the illumination area includes imaginary cells superimposed on the illumination area, each cell has a cell center, and each of the candidate beam centers includes one of the cell centers. The imaginary cells are substantially hexagonal in shape. The method where the reuse factor k for each of the candidate beam centers is constrained by the hexagonal geometry. The method where the centers of the imaginary cells are not restricted to a hexagonal lattice. The method may include setting the reuse factor k for each of the candidate beam centers by choosing either a next smallest reuse factor k1 or a next largest reuse factor k2 from a set of reuse factors based on a probability p. The method may include generating a current beam center set by sequentially adding a respective candidate beam center of the candidate beam centers when the respective candidate beam center is outside a respective reuse distance D from each of the beam centers already in the current beam center set. The candidate beam centers are ordered by a traffic metric associated with each of the candidate beam centers. Implementations of the described techniques may include hardware, a method or process, or computer software on a computer-accessible medium.

One general aspect includes a beam forming system to schedule using a variable stayout distance when beam hopping. The system includes a satellite covering an illumination area and candidate beam centers disposed in the illumination area; and a stayout scheduler to measure a respective scan angle from an antenna boresight to a respective beam center of the candidate beam centers, and to determine a reuse factor k, for each of the candidate beam centers, based on a proportion of the respective scan angle to a maximum scan angle. Other embodiments of this aspect include corresponding computer systems, apparatus, and computer programs recorded on one or more computer storage devices, each configured to perform the actions of the methods.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
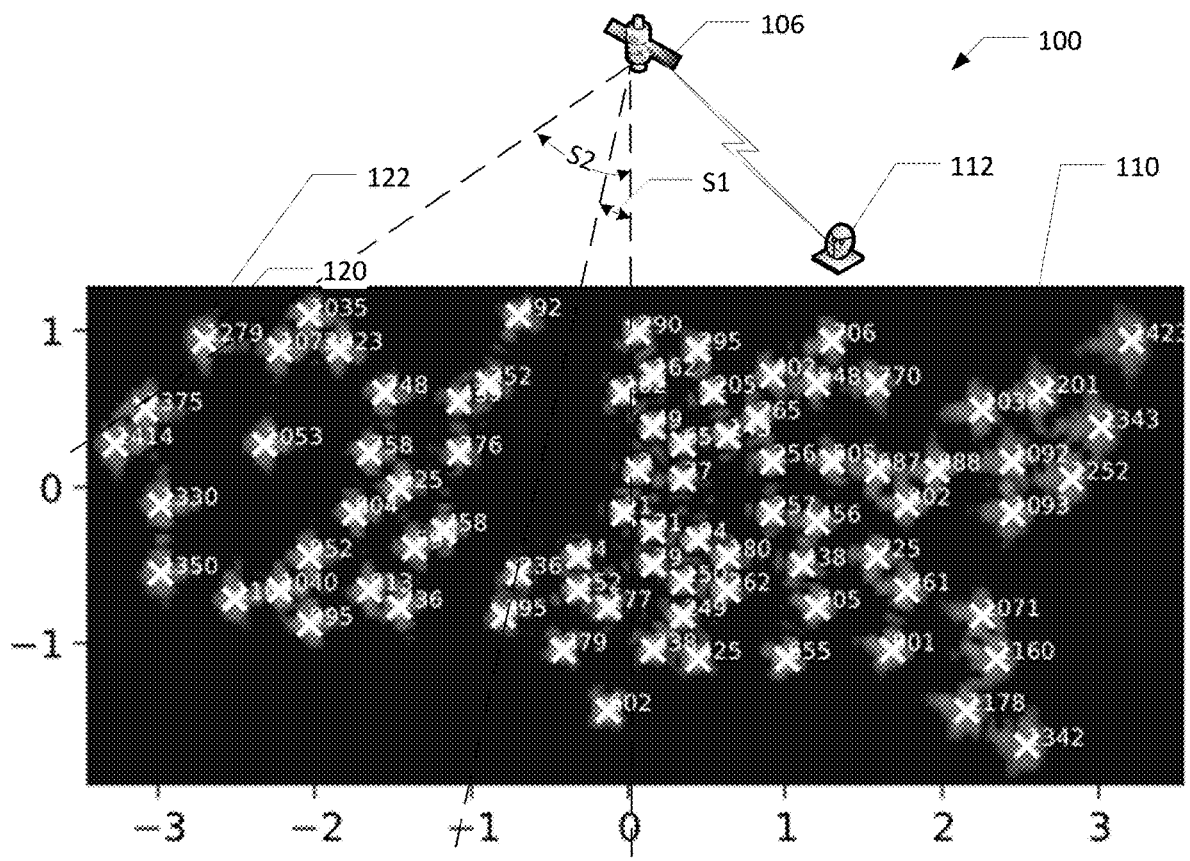
FIG. 1 illustrates a beam forming system to schedule beam hopping using a variable stayout distance according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

In the current teachings, a distance measure refers to U, V coordinates. U, V coordinates are angles, measured from a satellite's antenna (boresite) point of view. As such, in the present teachings the term "distance" is an angular distance. Moreover, in the present teachings, a use of the well-known concept of reuse color is not advocated. The reuse color concept is being used to find the set of possible distances between beam centers.

Classical satellite communication systems have typically implemented a fixed cellular reuse to control inter-cell interference. Cells having cell centers that are co-incident with a beam center 120 are laid onto the earth's surface to provide an illumination area 110 of the satellite 106. Signal levels from a beam directed to a target cell are typically high enough to cause significant interference to an immediately adjacent cell to the target cell. As such, illumination of the immediately adjacent cells may be chosen to use orthogonal resources to limit interference. Orthogonal resources could be frequency, time, and/or polarization. For example, in a 3-color reuse design there might be 3 different (orthogonal) frequency bands. The cells are colored (e.g., R, G, B) and adjacent cells are assigned colors (frequency bands) so that no two immediately adjacent cells have the same color.

Some more recent satellite communication systems have implemented systems in which the beam laydowns are not constant, also referred to as "beam hopping" systems without a concept of a variable stayout distance. In this beam hopping system, the set of cells sharing non-orthogonal resources (e.g., operating at the same time, frequency, and polarization) is not constant; however, the stayout distance in this prior art system is constant.

The principle of having a variable stayout distance between beam centers can be applied to a general beamforming system, for example, a beamforming system aiming beam centers at arbitrary points. In this case the stayout distance D would not be restricted to distances matching the distance between fixed beam centers on a hexagonal grid.

In some embodiments, the beamforming system may be simplified by using a set of potential beam centers that are not arbitrary points but are restricted to a certain set of potential points. In some systems, a hexagonal grid tiles the plane and the centers of this grid are the set of possible beam centers. Hexagonal grid lines are used in radio communication systems, such as cellular systems (with or without beam forming), satellite systems, or the like. When restricting the distance between active beam centers on this grid to be greater than some minimal value, the distances between potential beam centers can only take on certain discrete values.

When beam centers are restricted to cell centers of a predefined grid (for example, the hexagonal grids of FIG. 3 and FIG. 4), an average stayout distance may be approximately achieved. Arbitrary stayout distances are not always achievable and are thus approximated with a discrete set of distances and the "coin toss". When implementing an average stayout, for each beam center, the process decides between the next largest stayout (compared to the desired average stayout) and the next smallest stayout (compared to the desired average stayout) by choosing between them with some probability. One obvious extension would be the use of three or more stayout distances.

FIG. 1 illustrates a beam forming system to schedule beam hopping using a variable stayout distance according to various embodiments.

FIG. 1 shows an example of a beam forming system 100 to schedule using a variable stayout distance when beam hopping. In FIG. 1, a beam center 120 is marked with an X, and a beam definition 122 is illustrated as a greyed region centered on the beam center 120. It is seen that the beams near the boresite (near the center of coverage area, i.e., at the origin 0,0) have a better beam definition (less diffused) than the beams farther from the boresite (near the corners of the coverage area, i.e., at −1, 3). The better-defined beams near the center cover smaller areas (in and around the targeted cell) as compared to the beams farther from the boresight. Therefore, the beams at the large scan angle are more subject to interference from adjacent beams. It would be advantageous for an overall system throughput to employ a larger stayout distance for the beams at the large scan angle and a smaller stayout distance for beams with small scan angle. A stayout scheduler 122 schedules beam hopping using a variable stayout distance.

A useful guide to determining a variable stayout is to employ a reuse factor k1, corresponding to scan angle S1 (see FIG. 1) near the boresite and a reuse factor k2, corresponding to a maximum scan angle S2. For a beam at a scan angle S, the reuse factor k may be defined as k=F(S) for some function F. The function F could be any function chosen to vary the stayout distance according to scan angle. For example, suppose the minimum k is $k_{min}$, maximum k is $k_{max}$, and the maximum scan angle is $S_{max}$, the reuse factor k may be calculated as:

$$k = F(S) = k\min \times \left(1 - \left(\frac{S}{S\max}\right)^\alpha\right) + k\max \times \left(\frac{S}{S\max}\right)^\alpha$$

The exponent α might be set to 2 for example.

In the exemplary system, after determining or choosing the variable reuse factor k the variable reuse may be implemented. One way to implement the variable reuse is to find the corresponding reuse distance D by applying the previous formula relating D to k. This approach would be ideal for systems in which the cell centers are not restricted to lie on a hexagonal grid in which case the reuse distance D is applied directly as the stayout distance associated with that cell center. For systems where the locations of the possible beam centers form a hexagonal grid, the distances between beam centers cannot take on all possible values. So, for an arbitrary stayout distance D, a minimal inter-beam distance will be some other D', where D' corresponds to the next possible reuse distance greater than D. Because of this, a better approach to determine the stayout distance may be implemented as a "coin toss".

Suppose we wish to implement a system where the inter-beam distances correspond to a reuse factor having an average value of k. As is well known, not all values of reuse factor k are possible; only $k=i^2+ij+j^2$ for integers i, j are possible.

A "coin toss" can choose between the next lowest reuse distance k1<k and the next higher k2>k. Then for any potential beam, a stayout distance may be chosen by flipping a biased coin and choosing a distance corresponding to k2 with probability p and choosing a distance corresponding to k1 with probability 1−p, where an exemplary p may be chosen by $$p = \frac{k-k1}{k2-k1}$$

Using this scheme, the average reuse factor for the system will be k as is easily verified. Combining the variable reuse described above for choosing the reuse factor as a function of a cell's scan angle with the coin toss scheme for implementing the variable reuse results in a design where the average reuse factor varies as a function of scan angle and the reuse choses locations corresponding to cell centers on the hexagonal grid.

Figure 2:
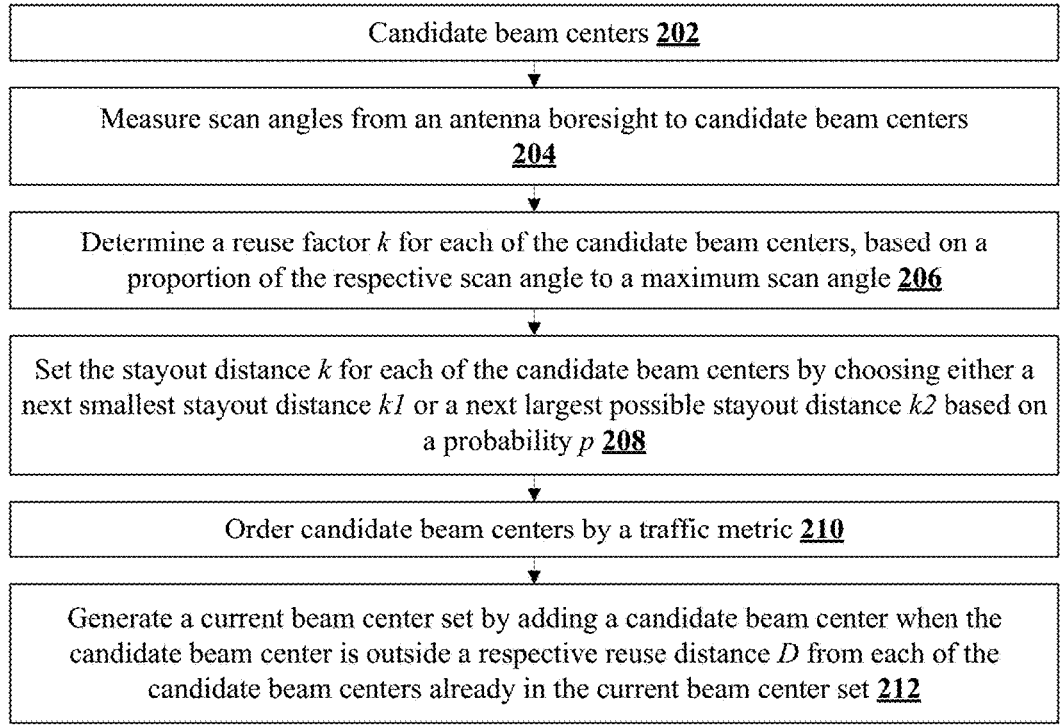
FIG. 2 illustrates a method for scheduling a variable stayout distance when beam hopping according to various embodiments.

FIG. 2 illustrates a method for scheduling a variable stayout distance when beam hopping according to various embodiments.

In one embodiment, a beam-forming beam-hopping system may implement a method 200 for scheduling a variable stayout distance when beam hopping. The system may be provided candidate beam centers per operation 202. Beam centers included as candidate beam centers may be changed and/or reordered at each time step (epoch). In some embodiments, the set of beam centers at each time step may be different and determined by, for example, traffic demand, fade at cell. Scan angles from an antenna boresight to candidate beam centers may be measured per operation 204. Here, measuring a scan angle includes obtaining the scan angle from a table and the like. Each candidate beam center may be processed sequentially to determine a reuse factor k for each of the candidate beam centers, based on a proportion of the respective scan angle to a maximum scan angle per operation 206. The candidate beam centers may be ordered by a traffic metric per operation 210, for example, by highest to lowest traffic demand, traffic age, traffic priority, traffic Quality of Service guarantee, or the like. Per operation 212, when generating a current beam center set by adding each candidate beam center, operation 212 checks whether a candidate beam center meets a respective reuse distance D from each of the candidate beam centers already in the current beam center set.

In some embodiments, each beam center may have a stayout distance associated with it. In some embodiments, the stayout distance is recomputed each epoch, for example, to account for the vagaries of the "coin toss." In other embodiments, while adding a beam center to the beam center set, the process may generate a stayout distance criteria for that beam center via a (pseudo)-random process, so that on average a desired value of stayout distance is produced. For example, the process 200 may set the reuse factor k for each of the candidate beam centers by choosing either a next smallest reuse factor k1 or a next largest reuse factor k2 based on a probability p per operation 208.

Figure 3:
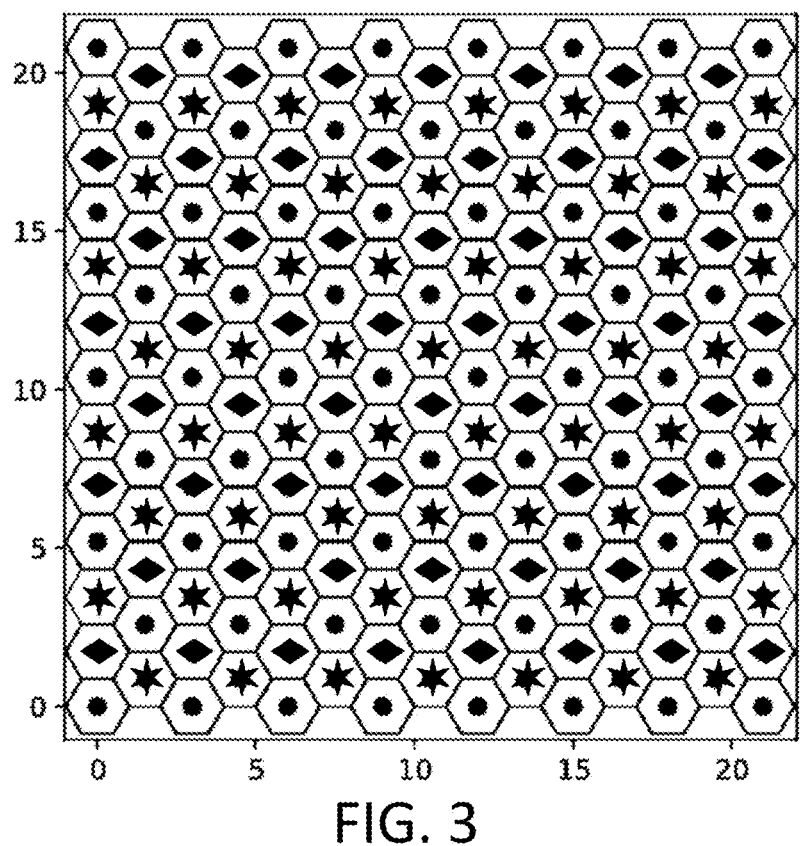
FIG. 3 illustrates an example hexagonal grid showing cellular reuse k=3 (i=1, j=1), according to various embodiments.

FIG. 3 illustrates an example hexagonal grid showing cellular reuse k=3 (i=1, j=1), according to various embodiments.

Figure 4:
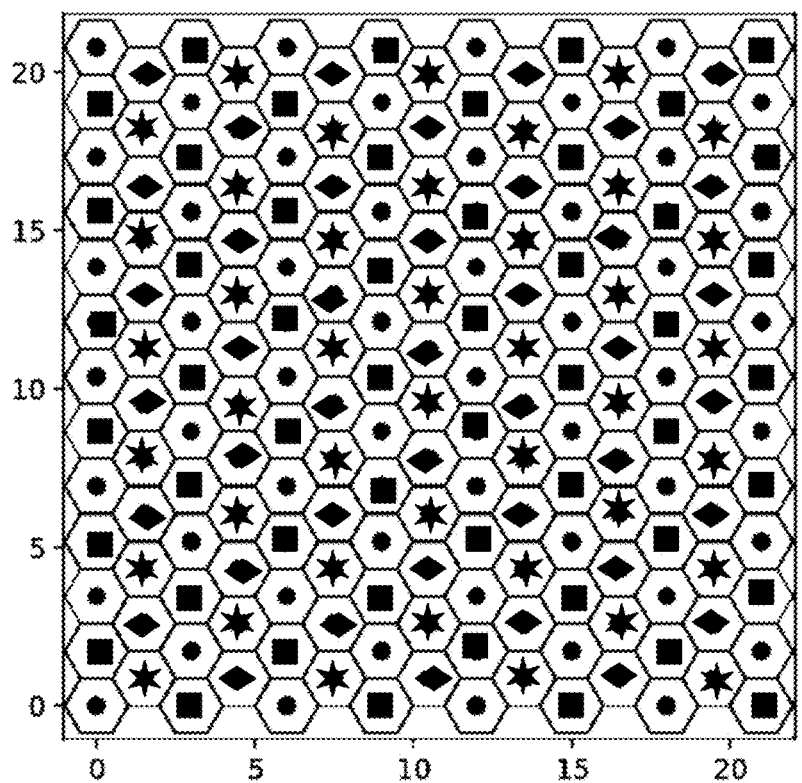
FIG. 4 illustrates an example hexagonal grid showing cellular reuse k=4 (i=0, j=2), according to various embodiments.

FIG. 4 illustrates an example hexagonal grid showing cellular reuse k=4 (i=0, j=2), according to various embodiments.

In the case of reuse 3 (FIG. 3), 3 colors illuminate the grid. A k=3 can be provided by setting i=1 and j=1 ($k=i^2+ij+j^2$). In the case of reuse 4 (FIG. 4), there are 4 colors. A k=4 can be provided by setting i=0 and j=2. The closest cell centers that can be simultaneously illuminated (same time/frequency/polarization) are the ones that are shown as the same color. In the case of k=3 the closest same color cell centers are at distance 3R, while for k=4 the distance is $2\sqrt{3}R$, where R is the radius of the hexagon.

As an example, a system level computer simulation was conducted to illustrate the benefit of the variable stayout concept. This simulation was for a satellite system covering a large number of users across the continental US. In this example a hexagonal grid was used for the potential beam centers, as described herein. Two cases are compared with the only difference between them being that one case has a fixed reuse factor k=3 while the other has variable reuse factor over the range k=[3 . . . 5]. The fixed reuse system delivers 3.73 units of throughput, while the variable reuse delivers 3.84 units.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A non-transient computer-readable storage medium having instructions embodied thereon, the instructions being executable by one or more processors to perform a method for scheduling a variable stayout distance when beam hopping, the method comprising:
    providing an illumination area of a satellite and candidate beam centers disposed in the illumination area;
    measuring a respective scan angle from an antenna boresight to a respective beam center of the candidate beam centers;
    determining a reuse factor k, for each of the candidate beam centers, based on a proportion of the respective scan angle to a maximum scan angle; and
    setting the reuse factor k for each of the candidate beam centers by choosing either a next smallest reuse factor k1 or a next largest reuse factor k2 from a set of reuse factors based on a probability p.

2. The method of claim 1, wherein the illumination area comprises imaginary cells superimposed on the illumination area, each cell has a cell center, and wherein each of the candidate beam centers comprises one of the cell centers.

3. The method of claim 2, wherein the centers of the imaginary cells are restricted to a hexagonal lattice.

4. The method of claim 2 wherein the centers of the imaginary cells are not restricted to a hexagonal lattice.

5. The method of claim 1, wherein imaginary cells are substantially hexagonal in shape.

6. The method of claim 1, wherein the reuse factor k for each of the candidate beam centers is calculated as $$k = F(S) = k\min \times \left(1 - \left(\frac{S}{S\max}\right)^{\alpha}\right) + k\max \times \left(\frac{S}{S\max}\right)^{\alpha}$$

with $\alpha$ being 2.

7. A non-transient computer-readable storage medium having instructions embodied thereon, the instructions being executable by one or more processors to perform a method for scheduling a variable stayout distance when beam hopping, the method comprising:
providing an illumination area of a satellite and candidate beam centers disposed in the illumination area;
measuring a respective scan angle from an antenna boresight to a respective beam center of the candidate beam centers;
determining a reuse factor k, for each of the candidate beam centers, based on a proportion of the respective scan angle to a maximum scan angle; and
generating a current beam center set by sequentially adding a respective candidate beam center of the candidate beam centers when the respective candidate beam center is outside a respective reuse distance D from each of the candidate beam centers already in the current beam center set.

8. The method of claim 7, wherein the candidate beam centers are ordered by a traffic metric associated with each of the candidate beam centers.

9. The method of claim 7, further comprising setting the reuse factor k for each of the candidate beam centers by choosing either a next smallest stayout distance k1 or a next largest reuse factor k2 from a set of stayout distances based on a probability p,
wherein the illumination area comprises substantially hexagonal imaginary cells superimposed on the illumination area, each cell has a cell center, and each of the candidate beam centers comprises one of the cell centers, and
wherein the reuse factor k for each of the candidate beam centers is calculated as $$k = F(S) = k\min \times \left(1 - \left(\frac{S}{S\max}\right)^{\alpha}\right) + k\max \times \left(\frac{S}{S\max}\right)^{\alpha}$$

with $\alpha$ being 2.

10. A beam forming system to schedule using a variable stayout distance when beam hopping, the system comprising:
a satellite covering an illumination area and candidate beam centers disposed in the illumination area; and
a stayout scheduler to measure a respective scan angle from an antenna boresight to a respective beam center of the candidate beam centers, and to determine a reuse factor k, for each of the candidate beam centers, based on a proportion of the respective scan angle to a maximum scan angle,
wherein the stayout scheduler sets the reuse factor k for each of the candidate beam centers by choosing either a next smallest reuse factor k1 or a next largest reuse factor k2 from a set of stayout distances based on a probability p.

11. The system of claim 10, wherein the illumination area comprises imaginary cells superimposed on the illumination area, each cell has a cell center, and wherein each of the candidate beam centers comprises one of the cell centers.

12. The system of claim 11, wherein the centers of the imaginary cells are restricted to a hexagonal lattice.

13. The system of claim 11, wherein the centers of the imaginary cells are not restricted to a hexagonal lattice.

14. The system of claim 11, wherein imaginary cells are substantially hexagonal in shape.

15. The system of claim 10, wherein the reuse factor k for each of the candidate beam centers is calculated as $$k = F(S) = k\min \times \left(1 - \left(\frac{S}{S\max}\right)^{\alpha}\right) + k\max \times \left(\frac{S}{S\max}\right)^{\alpha}$$

with $\alpha$ being 2.

16. The system of claim 10, wherein the stayout scheduler generates a current beam center set by sequentially adding a respective candidate beam center of the candidate beam centers when the respective candidate beam center is outside a respective reuse distance D from each of the candidate beam centers already in the current beam center set.

17. The system of claim 16, wherein the candidate beam centers are ordered by a traffic metric associated with each of the candidate beam centers.

18. The system of claim 16, wherein the stayout scheduler sets the reuse factor k for each of the candidate beam centers by choosing either a next smallest reuse factor k1 or a next largest reuse factor k2 from a set of stayout distances based on a probability p,
wherein the illumination area comprises substantially hexagonal imaginary cells superimposed on the illumination area, each cell has a cell center, and each of the candidate beam centers comprises one of the cell centers, and
wherein the reuse factor k for each of the candidate beam centers is calculated as $$k = F(S) = k\min \times \left(1 - \left(\frac{S}{S\max}\right)^{\alpha}\right) + k\max \times \left(\frac{S}{S\max}\right)^{\alpha}$$

with $\alpha$ being 2.

* * * * *